US012705586B2

(12) United States Patent
LeBlanc

(10) Patent No.: US 12,705,586 B2
(45) Date of Patent: Aug. 11, 2026

(54) SYSTEM AND METHOD FOR ASSURING COMMERCIAL REGULATORY COMPLIANCE

(71) Applicant: Gina LeBlanc, Safety Harbor, FL (US)

(72) Inventor: Gina LeBlanc, Safety Harbor, FL (US)

( * ) Notice: Subject to any disclaimer, the term of this patent is extended or adjusted under 35 U.S.C. 154(b) by 0 days.

(21) Appl. No.: 18/830,477

(22) Filed: Sep. 10, 2024

(65) Prior Publication Data

US 2025/0005539 A1 Jan. 2, 2025

Related U.S. Application Data

(60) Division of application No. 16/703,076, filed on Dec. 4, 2019, now Pat. No. 12,086,767, and a continuation of application No. 15/546,489, filed on Jul. 26, 2017, now abandoned.

(51) Int. Cl.
*G06Q 20/02* (2012.01)
*G06Q 30/04* (2012.01)
*G06Q 30/0601* (2023.01)
*H04L 67/52* (2022.01)

(52) U.S. Cl.
CPC ........... *G06Q 20/027* (2013.01); *G06Q 20/02* (2013.01); *G06Q 30/04* (2013.01); *G06Q 30/0607* (2013.01); *H04L 67/52* (2022.05)

(58) Field of Classification Search
None
See application file for complete search history.

(56) References Cited

U.S. PATENT DOCUMENTS

2004/0073498 A1 4/2004 Breen et al.
2007/0138260 A1* 6/2007 Keys .................... G06Q 20/341 235/380
2008/0110982 A1* 5/2008 Song ...................... G06Q 30/04 235/380
2009/0112747 A1 4/2009 Mullen et al.
(Continued)

OTHER PUBLICATIONS

C. Molina-Jimenez, S. Shrivastava and M. Strano, "A Model for Checking Contractual Compliance of Business Interactions," in IEEE Transactions on Services Computing, vol. 5, No. 2, pp. 276-289, Apr.-Jun. 2012, doi: 10.1109/TSC.2011.37. (Year: 2012).*
(Continued)

*Primary Examiner* — Eduardo Castilho
(74) *Attorney, Agent, or Firm* — Bochner PLLC; Andrew D. Bochner; Ross Brown

(57) ABSTRACT

System and method for adaptively processing financial payments. A payment provider service obtains verification of information for approval of an electronic payment in a web-based sale. A payment gateway includes a processor and a non-transitory computer-readable medium having stored thereon a series of program steps and a database which stores rules applicable to transactions. Execution of the program steps implements a compliance and payment process, based on compliance rules and funds approval of the transaction. Execution of the compliance and payment process provides a decision whether to block or authorize the transaction. When the compliance and payment process provides a decision to authorize a transaction, the program steps provide a request to the payment provider service for transfer of electronic funds to provide the seller's payment.

9 Claims, 22 Drawing Sheets

(56) References Cited

U.S. PATENT DOCUMENTS

| | | | | |
|---|---|---|---|---|
| 2009/0157519 | A1 | 6/2009 | Bishop et al. | |
| 2009/0210240 | A1* | 8/2009 | Benschop | G06Q 20/20 705/317 |
| 2013/0297510 | A1* | 11/2013 | Ducote | G06Q 20/12 705/44 |
| 2014/0337228 | A1* | 11/2014 | Grinberg | G06Q 20/382 705/44 |
| 2014/0379448 | A1 | 12/2014 | Gregory | |
| 2015/0012372 | A1* | 1/2015 | Veseli | G06Q 20/20 705/16 |
| 2016/0277412 | A1* | 9/2016 | Streuter | G06Q 20/1085 |

OTHER PUBLICATIONS

Communication pursuant to Article 94(3) EPC of the European Patent Office in related European Patent Appl. No. 16744286.2, dated Nov. 26, 2024, 5 pages.

* cited by examiner

Portfolio Perspective+New | Details | Resellers | Merchants | Announcements | Provisioning | Log Out |

100: Portfolio 1 | Policy | Distributions | Defaults (Extended) | Agreements | Security | Perspective |

Distributions x

Distribution Search

Name | Code | Create Date | Find | Clear |

Distribution List

| Code | Name | Create Date |
|---|---|---|
| 1 | Schema 1 | 01/12/15 |
| 2 | Schema 1 | 01/13/15 |
| 3 | 111 | 01/15/15 |
| 4 | Schema 333 | 01/19/15 |

Fig. 5

| Distributions | | | | | | | |
|---|---|---|---|---|---|---|---|
| New Distribution Search Detail | | | | | | | |
| Name | Schema 5 | Active | ☑ | Show Active ▼ | | | |
| Account type | | Amount | | Source | | | Destination |
| Any ▼ | Move $ | 1.00 | % of | Remaining ▼ | Fee | amount to | Convenience Fee |
| Bank Account ▼ | Move $ | 2.00 | % of | Total ▼ | Net | amount to | Holding Account |
| Any ▼ | Move $ | 3.00 | % of | Remaining ▼ | Tax | amount to | Vendor1 |
| Any ▼ | Move $ | 0.00 | % of | Remaining ▼ | Gross | amount to | Vendor2 |

Fig. 6A

| Name | | |
|---|---|---|
| Code | | ID |
| ID | Code | Name |
| 1 | 1 | Reseller12251212 |
| 3 | | Reseller3 |

Fig. 6B

| CC/ACH | Move $\|___\| and \|___\|% of | \|________\| | \|___\| amount | to \|___\| | \|___\| |
|---|---|---|---|---|---|
| Any | | total remaining | net | merchant | (reseller name is selected here) |
| CC | | | fee | fee balance | |
| ACH | | | tax | vendor1 | |
| | | | vendor | vendor2 | |
| | | | gross | vendor3 | |
| | | | | vendor4 | |
| | | | | vendor5 | |
| | | | | taxes | |
| | | | | other | |
| CC/ACH | | | | | |

Fig. 6C

| Distributions | | | | |
|---|---|---|---|---|
| Distributions: | M : 8000 : | nafonchyna | Distribution Scheme | Save Close |
| Attached Distributions | | | [Distribution 1 Name] > | Modify |
| ID | Name | Status | [Distribution 2 Name] > | Copy to... |
| 1 | [Name] | ☑ (x) (view) | [Distribution 3 Name] > | Copy from... |
| | | | [Distribution 4 Name] > | Enable |
| | | | [Distribution 5 Name] > | Disable |
| | | | | Delete |

Fig. 7

General x | Fees x

Fees: A :25001 : Send Rent Now : demand-cycle Export Type Save Close ?

Policy | Realtime | Realtime (Extended) | Batch | Flat | Recurring

Billing Cycle

| ☑ 01 | ☐ 02 | ☐ 03 | ☐ 04 | ☐ 05 | ☐ 06 | ☐ 07 | ☐ 08 | ☐ 09 | ☐ 10 | ☐ 11 | ☐ 12 | ☐ 13 | ☐ 14 |
|---|---|---|---|---|---|---|---|---|---|---|---|---|---|
| ☑ 15 | ☐ 16 | ☐ 17 | ☐ 18 | ☐ 19 | ☐ 20 | ☐ 21 | ☐ 22 | ☐ 23 | ☐ 24 | ☐ 25 | ☐ 26 | ☐ 27 | ☐ 28 |

Charge recurring fees on:

| Realtime | | Batch | |
|---|---|---|---|
| Processing Cost | | Processing Cost | |
| Cards | ○ignore ◉include | Cards | ○ignore ◉include |
| Amex | ◉ignore ○include | Amex | ◉ignore ○include |
| ACH | ◉ignore ○include | ACH | ◉ignore ○include |
| Deposit | | Deposit | |
| Convenience Fee | ◉ignore ○include | Convenience Fee | ◉ignore ○include |
| Visa | ○ignore ◉include | Visa | ○ignore ◉include |
| Master Card | ○ignore ◉include | Master Card | ○ignore ◉include |
| Discover | ○ignore ◉include | Discover | ○ignore ◉include |
| ACH | ○ignore ◉include | ACH | ○ignore ◉include |
| American Express | ◉ignore ○include | American Express | ◉ignore ○include |
| Visa Pin Debit | ◉ignore ○include | | |
| MasterCard Pin Debit | ◉ignore ○include | Fees Policy | % \| $ |
| | | Payments (Regular) | ☑ \| ☑ |

Fig. 8A

| Fees: M :370-100 : Agile Tech Solutions LLC : demand-cycle | | | | |
|---|---|---|---|---|
| Policy \| Realtime \| Realtime (Extended) \| Batch \| Flat \| Recurring | | | | |
| Visa (sale) | | Buy Rate | | Fee |
| Visa Processing | % | 1.80 | % | 3.50 |
| Visa per item | $ | 0.05 | $ | 0.25 |
| Master Card (sale) | | Buy Rate | | Fee |
| Master Card Processing | % | 1.80 | % | 3.50 |

Fig. 8B

| Funding Policy | |
|---|---|
| M – money is taken from the merchant balance<br>F – money is taken from convenience fee balance | |
| FP | |
| M | <- show this dropdown list on clicking on M |
| M merchant | |
| F convenience fee | |

Fig. 8C

| | A:51031:CORNELL BE ▼ | Accounts | Chargebacks | Adjustments |
|---|---|---|---|---|
| General x | Remittance x | | | |
| Remittance:A:51031: CORNELL BEDFORD HOLDINGS LLC | Save | Close | ? | |

| Settings M ? | | Balance A ? | |
|---|---|---|---|
| Remitter | ▼ | Total | 0.00 |
| Mode | Retail And Batch ▼ | Net | 0.00 |
| Basis | Funding Date ▼ | | |
| Statement Review M ? | | Amount Limits A ? | |
| Merchant ☑ Reseller ☐ | | Remittance A ? | |
| Period M ? | | Merchant Fees A ? | |
| Deposit | 1 | Fee Withdrawal Policy | Withdrawal ▼ |
| ACH | 1 | Recurring Fees Begin Date | 02/10/14 |
| CC | 1 | Merchant Statement A ? | |
| Amex | 1 | Export | |
| Cutoff | 06:00 PM | Archive | |
| | | Mailing Policy | Notification And Statement ▼ |
| | | Recipient List | |

Fig. 9

| Statement Detail | | | | | | | | |
|---|---|---|---|---|---|---|---|---|
| Group | Description | Caption | Amount | | | | | |
| Submission: 29357 – 12/02/2014 - Realtime | | | | | | | | |
| Submissions (Pmt) | Visa | 2 | USD | 2069.98 | USD | 2069.98 | | |
| | ACH | 1 | USD | 2064.99 | USD | 2064.99 | | |
| | Discover | 1 | USD | 5154.99 | USD | 5154.99 | | |
| Declines (Pmt) | Visa Declines | 1 | USD | 1034.99 | USD | 1034.99 | | |
| Net (Pmt) | Visa Net | 1 | USD | 1034.99 | | | USD | 1034.99 |
| | ACH Net | 1 | USD | 2064.99 | | | USD | 2064.99 |
| | Discover Net | 1 | USD | 5154.99 | | | USD | 5154.99 |
| Total Count: | | 3 | | Total Amount: | | | USD | 8,254.97 |
| Distributions: 29357 – 12/02/2014 - Realtime | | | | | | | | |
| Reseller | SRN | | | | | | USD | -14.97 |
| Merchant | Convenience fee balance | | | | | | USD | -240.00 |
| Merchant | Merchant balance | | | | USD | -8,000.00 | | |
| Total Count: | | | | Total Amount: | | | | 8,000.00 |
| Submissions: none | | | | | | | | |
| Adjustments | Previous Balance | | | | | | USD | 0 |
| Remittance | Remittance (ACH) | | | | | | USD | -8,000.00 |

Fig. 10A

| Summary | |
|---|---|
| Previous Balance | 0.00 |
| Current Balance | 8,254.97 |
| | |
| Reserve Adjustments | 0.00 |
| Balance Adjustments | 0.00 |
| Writeoffs/Reimbursements | 0.00 |
| Hold | 0.00 |
| | |
| Distributions | -254.97 |
| | |
| Net Due To Client | 8,000.00 |
| | |
| Remittance (Withdrawal) | 8,000.00 |
| | |
| Remaining Balance | 0.00 |
| | |
| Totals | |
| Net Amount | 8,254.97 |
| Returns & Chargebacks | 0.00 |
| Adjustments | 0.00 |

Fig. 10B

| Transaction List | | | | | | | | | | |
|---|---|---|---|---|---|---|---|---|---|---|
| Merchant Account | ID | Date/ Time | Custo mer Name | Sourc e | Type | Cc/Bank Account | Amount | Net | Distribu tion | Status |
| 45003: 831 Madison Realty LLC | 172 874 | 12/2/20 14 9:27 | Eileen Chian g | Real-time | Sale | 1****43 44 | 1,034.9 9 | 1,034 .99 | 4.99 | Process ed |
| 45003: 831 Madison Realty LLC | 172 874 | 12/2/20 14 9:27 | Eileen Chian g | Real-time | Sale | 2****43 44 | 2,064.9 9 | 2,064 .99 | 4.99 | Process ed |
| 45003: 831 Madison Realty LLC | 172 874 | 12/2/20 14 9:27 | Eileen Chian g | Real-time | Sale | 3****43 44 | 5154.99 | 5154. 99 | 4.99 | Process ed |
| | | | | | | Total (all) | 8,254. 97 | 8,25 4.97 | 14.97 | |

Fig. 11

| Distribution rule: Transaction ID: 111000 SRN | | | | | | View Distribution Scheme | Close | | | | |
|---|---|---|---|---|---|---|---|---|---|---|---|
| | | | | | | | Net | Conv. Fee | Tax | Vendors | Gross |
| | Initial State | | | | | | $1000 | $34.99 | $0 | $0 | $1,034.99 |
| 1 | Move | 4.99 | of | 34.99 | to | [SRN] | $1000 | $0 | $0 | $0 | $1,030 |
| 2 | Move | 30 | of | 30 | to | Convenience Fee Balance | $1000 | $0 | $0 | $0 | $1,000 |
| 3 | Move | 1000 | of | 1000 | to | Merchant Balance | $0 | $0 | $0 | $0 | $0 |

| Distribution rule: Transaction ID: 111000 Locktrust | | | | | | | | | | | |
|---|---|---|---|---|---|---|---|---|---|---|---|
| | | | | | | | Net | Conv. Fee | Tax | Vendors | Gross |
| | Initial State | | | | | | $1000 | $30 | $80 | $0 | $1,110 |
| 1 | Move | 30 | of | 30 | to | Convenience Fee Balance | $1000 | $0 | $80 | $0 | $1,080 |
| 2 | Move | 80 | of | 80 | to | [tax] | $1000 | $0 | $0 | $0 | $1000 |
| 3 | Move | 100 | of | 100 | to | [reserve] | $900 | $0 | $0 | $0 | $900 |
| 4 | Move | 900 | of | 900 | to | Merchant Balance | $0 | $0 | $0 | $0 | $0 |

| Distribution rule: Transaction ID: 111000 SND | | | | | | | | | | | |
|---|---|---|---|---|---|---|---|---|---|---|---|
| | | | | | | | Net | Conv. Fee | Tax | Vendors | Gross |
| | Initial State | | | | | | $0 | $125 | $0 | $875 | $1,000 |
| 1 | Move | 180 | of | 875 | to | Vendor/[V1 name] | $0 | $125 | $0 | $695 | $820 |
| 2 | Move | 270 | of | 695 | to | Vendor/[V2 name] | $0 | $125 | $0 | $425 | $550 |
| 3 | Move | 425 | of | 425 | to | Vendor/[V3 name] | $0 | $125 | $0 | $0 | $125 |
| 4 | Move | 125 | of | 125 | to | Convenience Fee Balance | $0 | $0 | $0 | $0 | $0 |

Fig. 12

| Transaction | | | | | |
|---|---|---|---|---|---|
| Credit Card # | ****8394 | Tax | | Processor Response | |
| Exp Date | 0317 | National Tax | | Code | A01 |
| Token Code | VC9999**8394 | Local Tax | | Message | Approved (Approved) |
| Transaction Code | 188282 | Address | | CSC Code | M |
| Customer Code | **917 | Street | *** Buckler Ct | AVS Code | 4E |
| Origin Code | | City | Simpsonville | Descriptor | |
| Item Code | 188282 | State | United States US South Carolina | Item | |
| | | Zip Code | | Merchant | |
| | | Phone | | | |
| | | Email | | | |

| Items | | | | | | | | | | | |
|---|---|---|---|---|---|---|---|---|---|---|---|
| | Code | | Description | | Qty | | Cost | Dis-count | | Tax | | Amount |
| | 345543 | c | Milk Shake | | 1 | u x | 5.00 | 0.00 | | 0.00 | t | 5.00 |
| | 455345 | c | Protein Bar | | 5 | u x | 1.00 | 0.00 | | 0.00 | t | 5.00 |
| - | | | Discount | | | | | -1.00 | | | | -1.00 |
| | 453454 | c | T-shirt: Size M | | 1 | u x | 50.00 | -5.00 | d | 3.60 | t | 48.60 |
| - | 453455 | c | T-shirt: Size L | | 1 | u x | 50.00 | -5.00 | d | 3.60 | t | -48.60 |

Fig. 13A

| Vendors | | | |
|---|---|---|---|
| Code | Name | Amount | Share, % |
| | | | |

| Distributions | Load |
|---|---|
| Related Transactions by Customer Code | Load |
| Related Transactions by Account Number | Load |

Fig. 13B

| Distributions perspective | | | | | | | |
|---|---|---|---|---|---|---|---|
| | v | +new | | Details | Statements | | Log Out |
| | | | | | | | Perspective |
| | | | | | | | |

Fig. 14

| New vendor x | | | | | |
|---|---|---|---|---|---|
| Vendor Details | | | | Save ¦ Close ¦ ? | |
| Detail | | Contact Information | | Business Information | |
| ID | 8 \| Active ☑ | Contact Name | | Legal Name | |
| Code | | Street | | Web Site | |
| Name | | City | | Federal Tax ID | |
| Create Date | | Country | ▼ | State Tax ID | |
| Merchant | ▼ | State | ▼ | Sales Tax ID | |
| Remittance Emails | | Zip Code | | Ownership Structure | ▼ |
| Deposit Information | | Phone | | Estimation Period | ▼ |
| Holder Name | | Fax | | Est. Transaction Volume | |
| Routing Number | | Email | | Est. Transaction Amount | |
| Account Number | | | | Relationship Begin Date | |
| | | | | Currency | ▼ |

Fig. 15A

| New Tax x | |
|---|---|
| Tax Details | Save \| Close \| ? |
| Detail | |
| ID | 8 \| Active ☑ |
| Code | |
| Name | |
| Create Date | |
| Merchant | ▼ |
| Remittance Emails | |
| Deposit Information | |
| Holder Name | |
| Routing Number | |
| Account Number | |

Fig. 15B

| Select Recipient | BestStore123 \| v | | | |
|---|---|---|---|---|
| Distribution Statement Search: Vendor 1: BestStore123 | | | | |
| Date | 11/4/2014 – 12/1/2014 | Status \| v | | Find \| Clear |
| Vendor 1: BestStore123: Distribution list | | | | |
| ID | Start Date | End Date | Status | Amount |
| | | | | |
| | | | | |
| | | | | |

Fig. 16

| Distribution statements by date | | | | | | | |
|---|---|---|---|---|---|---|---|
| Recipient: Vendor 1: BestStore123 | | | | | Export | Close | |
| Activity | | | | Transactions | | | |
| Activity Date | v | Merchant Name | v | Count | Amount | Distribution Amount | dr |
| v 10/1/2014 | | | | | | | |
| | | **** | | 3 | 100.00 | 60.00 | dr |
| | | **** | | 4 | 200.00 | 70.00 | dr |
| | | MerchantA | | 5 | 300.00 | 80.00 | dr |
| | | MerchantB | | 6 | 400.00 | 90.00 | dr |
| | | MerchantC | | 7 | 500.00 | 100.00 | dr |
| **Total:** | | | | **25** | **15000.00** | **400.00** | **dr** |
| v 10/2/2014 | | | | | | | |
| | | MerchantB | | 4 | 300.00 | 100.00 | dr |
| | | MerchantC | | 5 | 400.00 | 200.00 | dr |
| **Total:** | | | | **9** | **700.00** | **300.00** | **dr** |
| Adjustments | | | | | | | |
| Total | | | | | | 0.00 | |
| Remittance | | | | | | | |
| **Total** | | | | **34** | **2200.00** | **700.00** | |

Fig. 17A

| Distribution statements by merchant | | | | | | | |
|---|---|---|---|---|---|---|---|
| Recipient: Vendor 1: BestStore123 | | | | | Export | Close | |
| Activity | | | | Transactions | | | |
| Activity Date | v | Merchant Name | v | Count | Amount | Distribution Amount | dr |
| v MerchantA | | | | | | | |
| 10/1/2014 | | | | *** | ***.** | 80.00 | dr |
| **Total:** | | | | *** | ***.** | **80.00** | **dr** |
| v MerchantB | | | | | | | |
| 10/1/2014 | | | | 6 | 400.00 | 90.00 | |
| 10/2/2014 | | | | 4 | 300.00 | 100.00 | |
| **Total:** | | | | **10** | **700.00** | **190.00** | **dr** |
| v MerchantC | | | | | | | |
| 10/1/2014 | | | | 7 | 500.00 | 100.00 | dr |
| 10/2/2014 | | | | 5 | 400.00 | 200.00 | dr |
| **Total:** | | | | **12** | **900.00** | **300.00** | **dr** |
| Adjustments | | | | | | | |
| Total | | | | | | 0.00 | |
| Remittance | | | | | | | |
| **Total** | | | | **34** | **2200.00** | **700.00** | |

Fig. 17B

Distribution statements by date 1) 1 x vendor | (90%) per transaction
Recipient: Vendor 1: BestStore123 | Close
Merchant: 27001: Splash and Dash for Dogs

| Transaction | | | | | Basis | | Rules | | |
|---|---|---|---|---|---|---|---|---|---|
| Date | ID | Customer Name | CC/Bank account | Amount | Type | Amount | Rate | Amount | Distribution Amount |
| 9/30/2014 | 111000 | Alex Smith | 1***2112 | $100.00 | Gross | 100 | 90% | | $90.00 |
| 9/30/2014 | 111001 | John Smith | 2***3445 | $200.00 | Gross | 200 | 90% | | $180.00 |
| 9/30/2014 | 111002 | Jack Smith | 3***7898 | $300.00 | Gross | 100 | 90% | | $90.00 |
| **Total:** | **3** | | | | | | | | **$360.00** |

2) tax (Locktrust), e.g. 8%
Recipient: Holding account: Local tax 123 | Close
Merchant: 127001: Locktrust

| Transaction | | | | | Basis | | Rules | | |
|---|---|---|---|---|---|---|---|---|---|
| Date | ID | Customer Name | CC/Bank account | Amount | Type | Amount | Rate | Amount | Distribution Amount |
| 9/30/2014 | 111000 | Alex Smith | 1***2112 | $100.00 | Tax | 8 | 100% | | $8.00 |
| 9/30/2014 | 111001 | John Smith | 2***3445 | $200.00 | Tax | 16 | 100% | | $16.00 |
| 9/30/2014 | 111002 | Jack Smith | 3***7898 | $300.00 | Tax | 24 | 100% | | $24.00 |
| **Total:** | **3** | | | | | | | | **$48.00** |

Fig. 18

Distribution statements by recipient

3) Convenience fee SRN, 4.99
Recipient: Convenience fee | Close
Merchant: 111001: All Equity

| Transaction | | | | | Basis | | Rules | | |
|---|---|---|---|---|---|---|---|---|---|
| Activity Date | Transaction ID | Holder Name | Last 4 digits | Amount | Type | Amount | Rate | Amount | Distribution Amount |
| 9/30/2014 | 111000 | Alex Smith | 1***2112 | $107.99 | Fee | 7.99 | | $4.99 | $4.99 |
| 9/30/2014 | 111001 | John Smith | 2***3445 | $210.99 | Fee | 10.99 | | $4.99 | $4.99 |
| 9/30/2014 | 111002 | Jack Smith | 3***7898 | $313.99 | Fee | 13.99 | | $4.99 | $4.99 |
| **Total:** | **3** | | | | | | | | **$14.97** |

4) Convenience fee, 3%
Recipient: Convenience fee | Close
Merchant: 111001: All Equity

| Transaction | | | | | Basis | | Rules | | |
|---|---|---|---|---|---|---|---|---|---|
| Activity Date | Transaction ID | Holder Name | Last 4 digits | Amount | Type | Amount | Rate | Amount | Distribution Amount |
| 9/30/2014 | 111000 | Alex Smith | 1***2112 | $100.00 | Fee | $3.00 | 100 % | | $3.00 |
| 9/30/2014 | 111001 | John Smith | 2***3445 | $200.00 | Fee | $6.00 | 100 % | | $6.00 |
| 9/30/2014 | 111002 | Jack Smith | 3***7898 | $300.00 | Fee | $9.00 | 100 % | | $9.00 |
| **Total:** | **3** | | | | | | | | **$18.00** |

Fig. 19

SYSTEM AND METHOD FOR ASSURING COMMERCIAL REGULATORY COMPLIANCE

CROSS-REFERENCE TO RELATED APPLICATIONS

This is a divisional application of U.S. Ser. No. 16/703,076, filed Dec. 4, 2019, entitled, "System and Method for Assuring Commercial Regulatory Compliance," which is a continuation of U.S. Ser. No. 15/546,489, filed Jul. 26, 2017, entitled, "System and Method for Assuring Commercial Regulatory Compliance," which is a U.S. National Stage entry of PCT/US16/16023 entitled, "System and Method for Assuring Commercial Regulatory Compliance," filed Feb. 1, 2016. PCT/US16/16023 has a priority date of Jan. 30, 2015, from provisional application No. 62/110,434, also entitled, "System and Method for Assuring Commercial Regulatory Compliance." Applications are hereby incorporated in their entirety.

FIELD OF THE INVENTION

The present invention relates to methods of transferring funds and, in particular, systems and methods for incorporating compliance screening and allocating portions of effecting electronic transfers on e-commerce platforms.

BACKGROUND OF THE INVENTION

With a growing volume of international transactions subject to varied laws and regulations, it becomes more difficult to monitor or prevent specific types of electronic transactions. Legal restrictions also vary within political subdivisions of individual countries, and this further complicates an array of compliance requirements which are also subject to change as legislative bodies attempt to implement new policies.

As one example within the United States, some states have implemented general or specific legislation which can be applied to restrict on-line gaming. On the other hand, on the state level some legislative bodies have sought to expressly legalize forms of on-line gambling; and at the federal level, there have been efforts to permit licensing of internet gambling. There appears to be continued motivation to allow regulated arrangements that assure generation of taxable revenues at the state or federal level. Consequently, a pattern of "do's and don'ts" is subject to evolving complexities which merchants have to navigate through to assure compliance with applicable laws.

Moreover, existing federal laws in the United States prohibit banking institutions from processing transactions when the underlying activity is a form of gambling prohibited by a particular state. If gaming transactions originate from states in which the activity is not legally permitted, both the brokers and the processors can encounter liability for the violations. Compliance requires diligent monitoring. Yet it remains a difficult challenge to monitor interstate banking activities to ascertain whether the gambling (e.g., betting) is performed in a state where the activity is illegal.

The problems confronting sellers is rendered more complex with the mobility of payment activities, e.g., enabled by digital wallet systems and use of handheld devices for effecting transactions from varied locations. Thus, while verification systems can verify billing address information for the person owning a credit card, such confirmations can be of insufficient value if the transaction occurs in a different political subdivision than that in which the billing address is located. So, if it is legal to perform a type of transaction in the state in which the billing address is located, but the card owner is physically present in a state which prohibits the same transaction, the merchant is not necessarily aware that a legal compliance issue exists.

Although gaming transactions have been described to illustrate risks and burdens associated with compliance, it is desirable to provide solutions to numerous other compliance issues, both legal and non-legal, in e-commerce transactions.

In the United States, a limited number of states permit on-line purchase of prescription drugs from foreign pharmacies. Notwithstanding an ability to monitor geographic locations of mobile devices, a merchant may not be able to determine when a purchase is being legitimately made from within a state which permits the purchase, and not from within a state which prohibits the purchase. Summarily, the opportunities to incur regulatory violations or financial liabilities in relation to electronic transactions are varied and are many.

At times there may also be a need in the private sector to implement compliance monitoring and enforcement in electronic transactions. Examples include policies for limiting or monitoring transaction activities or the sale of specific goods and services in distribution chains based for example, on the buyer or seller location. This can be important during periods when there is a critical shortage of goods and services in certain geographic regions.

Generally, the task of monitoring transactions for a wide variety of compliance issues can create a necessary but costly burden, especially when there is risk of unacceptable outcomes. The outcomes include, but are not limited to, health, financial, legal and criminal consequences. Legal and criminal consequences may impact institutional providers or support services (e.g., financial institutions) as well as the buyer and the seller.

SUMMARY OF THE INVENTION

Embodiments of the present invention provide compliance solutions processes in electronic payment systems. In addition to transactions that involve either physical use of credit cards (where the card is physically present for inspection by a merchant) or card-not-present transactions, computer networks and electronic communications enable use of debit cards, electronic funds transfers and e-commerce payment systems, including digital wallet systems which enhance mobile payment capabilities.

According to one series of embodiments, a system is provided for adaptively processing financial payments in transactions. The system includes a payment provider service and a payment gateway server. The payment provider service obtains verification of information for approval of an electronic payment of funds for a seller's payment in a web-based sale for completion of a transaction for sale of a service or goods. The payment gateway server includes a processor and a non-transitory computer-readable medium having stored thereon a series of program steps and a first database which stores rules or laws applicable to transactions. Execution of the program steps by the processor implements a compliance and payment process, based on compliance rules and funds approval of the transaction so that funds may be allocated to the transaction of the seller. Execution of the compliance and payment process provides a decision as to whether to block or authorize the transaction. When the compliance and payment process provides a decision to authorize a transaction, the programs steps provide a request to the payment provider service for transfer of electronic funds to provide the seller's payment.

According to another embodiment of the invention, a payment gateway system is configured to allow or deny transactions or to allocate and effect payment of portions of transaction funds among multiple recipients. The system includes a computer system configured as a server to operate as payment gateway in a network. The computer system has a processor, memory and storage for data and one or more e-commerce applications which, when loaded into memory run on the computer system. The processor executes a series of operations which facilitate automated payment transactions in coordination with one or more payment service providers. The one or more applications functionally position payment gateway operation as an intermediary between the seller and the payment service provider so that information confirming verification and approval or a denial, provided from the payment service provider, is communicated through the payment gateway to the seller, informing the seller whether the sale can be completed or is to be denied. One or more applications include a rules based engine configured to run one or more logic based rules and to determine one or more of the following whether to block or authorize transaction based on both the goods and services to be purchased and buyer location at the time of initiating a payment transaction; and allocation of portions of a transaction payment to the seller and a one or more members in a group comprising a tax authority, a party imposing a convenience fee, a party imposing a reseller fee, a party imposing a shipping charge, and a party designated to receive a charitable contribution.

In another series of embodiments, a method is provided by which a payment gateway processes requests for financial transactions and payments. The payment gateway comprises a server, a processor, memory and storage. The storage is a non-transitory computer-readable medium containing (i) program steps for execution on the processor to respond to the requests for financial transactions and payments and (ii) information useful for implementing rules to determine compliance of the transaction, the method comprising executing on the processor steps to effect (i) receiving, from a point of sale, information about a transaction initiated by a buyer of a service or goods, including current location information of the buyer, and transaction information relating to payment by the buyer, into the server of the payment gateway; and (ii) performing a series of program steps based on rules or laws applicable to the buyer's transaction. Execution of the program steps by the processor implements a compliance and payment process, based on compliance rules and funds approval of the transaction, whereby funds may be allocated to the transaction of the seller. Execution of the compliance and payment process provides a decision based on the received location information of the buyer as to whether to block or authorize the transaction. When the compliance and payment process provides a decision to authorize the transaction, the program steps provide a request to the payment provider service for transfer of electronic funds to provide the seller's payment for sale of the service or goods.

BRIEF DESCRIPTION OF THE FIGURES

FIGS. 5-19 illustrate display screen data showing examples and features of the invention.

DETAILED DESCRIPTION OF THE INVENTION

Figure 1:
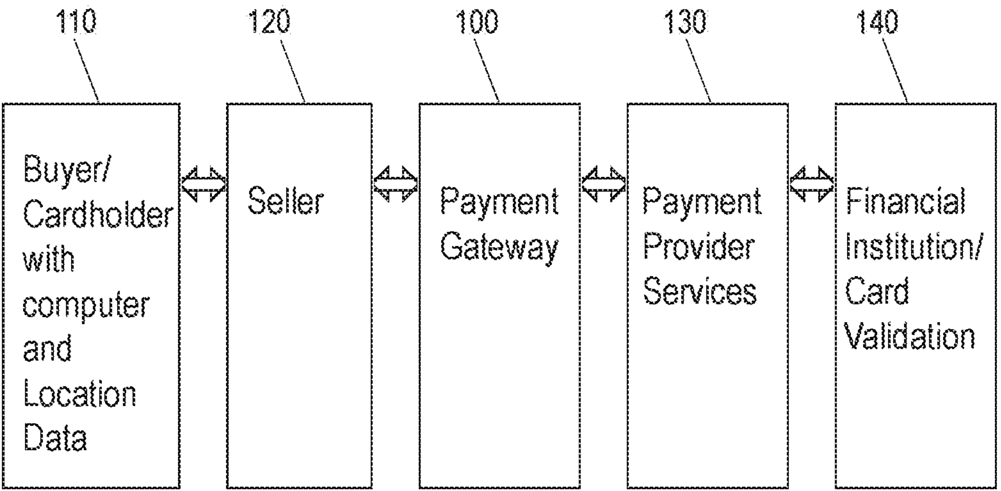
FIG. 1 is a simplified schematic illustration of parties and providers in an on-line transaction incorporating a Payment Gateway server according to the invention.

As used herein the terms "goods and services" and "goods or services" mean any item, service, or other activity or opportunity associated with a transaction for which a payment is made;

Merchant, retailer and seller all refer to a provider of any goods and services made available through a transaction. It is to be understood that in numerous embodiments of the invention a seller is a web-based operation which utilizes a server or other computer system, connected to a network, having processing capability (e.g., a microprocessor), memory and storage for data and an e-commerce application running on the system to process requests for goods and services from a buyer. The requests may be presented in an on-line shopping cart, for which payment information acquired from the buyer to effect completion of the sale of goods and services is subject to approvals received from a payment service provider via a payment gateway.

Payment Gateway refers to a payment gateway according to embodiments of the invention based on a computer based system, typically a server, connected to a network. A Payment Gateway server has processing capability (e.g., a microprocessor), memory, storage for data and one or multiple e-commerce applications which run thereon. A Payment Gateway facilitates automated payment transactions, between a seller and a buyer of goods and services, in coordination with one or more Payment Service Providers. The Payment Gateway is positioned as an intermediary between the seller and the Payment Service Provider such that information confirming verification and an approval or a denial, received by the Payment Service Provider, is communicated through the Payment Gateway to the seller. After approval or denial the transaction is completed or denied. It is becoming common that, with a growing number of payment gateways, the seller may have transactions completely performed on the servers of a payment gateway in a manner transparent to the buyer, so the buyer does not experience leaving the seller's website to make a payment.

A Payment Service Provider is a party retained by a seller to process electronic payments such as made with a credit card or a debit card by communicating with a card association and/or a bank. Payment Service Providers obtain verification of information, typically also initiate checks to prevent fraudulent activity, and transfer money from the buyer's source of funds to the seller's financial institution. It is to be understood that a Payment Service Provider comprises a server or other computer system, connected to a network, having processing capability (e.g., a microprocessor), memory and storage for data and one or more e-commerce applications running on the system to process requests from a payment gateway for approvals of electronic transfers of funds to complete transactions between the buyer and seller. Although the following description illustrates embodiments where the Payment Service Provider is distinct and separate from the Payment Gateway, it is to be understood that in embodiments of systems and methods according to the invention, the functions of the Payment Gateway and the Payment Service Provider may be performed by the same entity and may even be performed on the same server or groups of servers.

Embodiments of the invention reduce or eliminate risk of participating in transactions which are not in compliance with applicable laws. The disclosed systems and methods are flexible to deploy customized compliance criteria for at least banking institutions and merchants, with respect to any relevant political unit. The systems may be coupled to a data base that stores and periodically receives updated information concerning changes in the varied laws applicable to domestic and international transactions.

The Payment Gateway is also structured or programmed to provide requests to direct and transfer monetary allocations to authorities and other organizations at the gateway level, based on application of predefined criteria to both the data base information and information acquired in relation to the transaction. As a result, e-payments are reliably made to those authorities or other organizations at the time of sale. Thus there can be an immediate disbursement of those portions of the funds authorized by buyers and which are due to the authorities or other organizations without those same portions being routed to the seller prior to disbursement.

In this regard, a conventional payment gateway server can be programmed to provide, in one embodiment of the invention, a set of consecutive steps for funds distribution that may be applied to any transaction of a specific merchant based on a customized distribution scheme. A scheme is, for example, a set of consecutive steps of funds distribution that may be applied to any transaction of a specific merchant. In one embodiment, the merchant has a list of schemes.

The following examples illustrate how a conventional payment gateway, when configured as a Payment Gateway according to the invention, allocates appropriate portions of funds and performs operations of behalf of the merchant without the direct involvement of the seller or the seller's bank to determine and authorize payments or block payments in specific transactions. This enables the merchant to be free from data intensive compliance activities. The merchant may specify any desired distribution scheme suitable for its transactions.

The system divides allocations in a transaction into 2 parts:

- an amount that is sent to the merchant;
- an amount that is taken from the buyer payment as fees or other allocations.

An adaptive payments process handles payments between a sender of a payment and one or more receivers of the payment.

Use Cases

Three Examples (use cases) follow to illustrate variations of payment distributions:

Example 1: Allocation of Convenience Fee

The Buyer purchase is $1,000; the convenience fee is $30.00 (3% of $1000); $4.99 is an allocated reseller fee. The total amount billed and paid is $1,034.99.

- $1,000 is sent to the merchant.
- $4.99 is deducted for the reseller allocation.
- The remaining funds are the convenience fee balance, from which the processing cost is deducted.

Example 2: Allocation of Convenience Fee and Placement of Certain Part of Payment in Holding Account for Taxes The Buyer purchase is $1,000. $30 is added as the Convenience Fee (3% of $1000); $80 is added as an applicable tax (8%). The total paid by seller is $1,110.

The distribution rules are as follows:

- 100% of fees ($30) is allocated as the Convenience Fee (this money can later be used to cover merchant services fee).
- 100% of taxes ($80) is moved to a separate bank account associated with taxes for payment to designated tax authorities based on the rules and data base information.
- 10% of the remaining net amount $1,000 is moved to a reserve, and the remaining amount ($900) is allocated to the merchant ($900).

Example 3: A Predetermined Part of a Payment is Sent to a Vendor or Distributed Between Several Vendors and a Merchant

- The Buyer purchases 3 items at $50 each from the merchant and two other vendors in 1 order. The total purchase is $150.
- According to a prearrangement between a merchant and the other vendors, the merchant receives 10% of the $150: $15.
- The merchant and each other vendor receive $45.
- If a customer purchases 2 items from 2 vendors for the same total of $150, the merchant would still get $15 (10% of $150), but the vendors would each receive $67.50 each.

In one customization, the merchant may have up to 5 categories of sets of vendor allocations (e.g., each of the categories will have different vendor allocations).

To implement the adaptive payments logic, distribution rules (schemes) are created for one or more merchants in each portfolio.

To facilitate providing an understanding of how the invention directs and transfers monetary allocations to authorities and other organizations at the gateway level, an exemplary sequence of activities is described for an e-commerce payment process. Details of the payment process of lesser importance to the invention are omitted.

Once an e-commerce buyer commits to a purchase (e.g., via a request to proceed to checkout), the on-line transaction begins with the buyer responding to a prompt from the seller's webserver to send encrypted payment information for purchase of goods and services identified, for example, in a shopping cart. Transaction payment-related information provided by the buyer, (e.g., credit card, debit card or other information to effect electronic payment, including information routinely used for identifying fraudulent activities) may be sent to the payment gateway through the seller's system (as shown in FIG. 1), or may be sent directly to the Payment Gateway without being received into the seller's webserver. This may ensure that the seller's website activities comply with the Payment Card Industry (PCI) Data Security Standards).

Based on data transmitted to the Payment Gateway server, the server Screening Module identifies those initiated payment transactions which are approved to be sent to one or more front end Payment Provider Services and those which are to be blocked, based on predefined compliance issues.

Among those initiated payment transactions approved to be sent to one or more Payment Provider Services, the Payment Gateway server identifies those initiated payment transactions for which allocation distribution of the buyer's payment, or allocation of another fee (e.g., imposed on the buyer) is to be paid. Such other fees include convenience fees for use of an electronic payment. The Payment Gateway forwards the transaction information to a Payment Provider Service which communicates with the seller's bank.

The Payment Provider Service forwards the transaction information to a card association which may either (i) forward the transaction information to the bank under whose name the card is issued to obtain approval of the transaction; or (ii) provide or decline the transaction. A response as to whether the payment is approved or declined is then provided back to the Payment Gateway server, e.g., via the Payment Provider Service. The Payment Gateway server sends the determination of whether the transaction is accepted or declined to the seller's website to inform the seller and the buyer.

Based on determinations made with transaction information and database information, the server forwards information to one or more Payment Provider Services which service the seller's bank that is to receive part or all of the buyer's payment for identification of appropriate backend Payment Service Providers for all recipients of an allocation of distributions and fees.

The following detailed description intended to be read in conjunction with FIGS. 1-4 provides further understanding of Payment Gateway functionality for both compliance purposes, to reduce risk, and for purposes of allocating and transferring funds to multiple parties involved in a transaction.

Given the information normally provided to authorize a transaction, additional information, relating to the transaction and received into the Payment Gateway Server, may be provided by either or both the buyer and the seller. The additional information includes screening information processed by Compliance and Distribution Application Modules running on the Payment Gateway server. The additional information is indicative of (i) the specific goods and services to be sold, (ii) the location of the buyer and (iii) the location of the seller. The Compliance and Distribution Application Modules apply this information to determine whether one or more sets of rules are to be applied to determine, for example: (a) whether the subject matter of the transaction is of a type which must be reviewed to assess legal compliance with applicable laws; or (b) a distribution of the buyer's transaction payment is to be made in accord with a predetermined allocation.

FIG. 1 is a simplified illustration of parties and providers involved in an on-line transaction, including: a buyer 110 having a known location communicating through a device such as, for example, a personal computer, a tablet computer or a handheld device such as a mobile phone; a seller illustrated, for example, as a web-based operation 120 comprising a server computer connected to a network web; a Payment Gateway 100 comprising a Payment Gateway server 104, one of multiple Payment Provider Services 130; and a financial institution 140 or representative thereof such as a card association. All of the parties and providers are connected via a network which, in the disclosed embodiments is assumed to be the internet, represented by a series of arrows. Although the arrows indicate a common arrangement where the parties and providers communicate serially through one another, the communication is not so limited.

Figure 2:
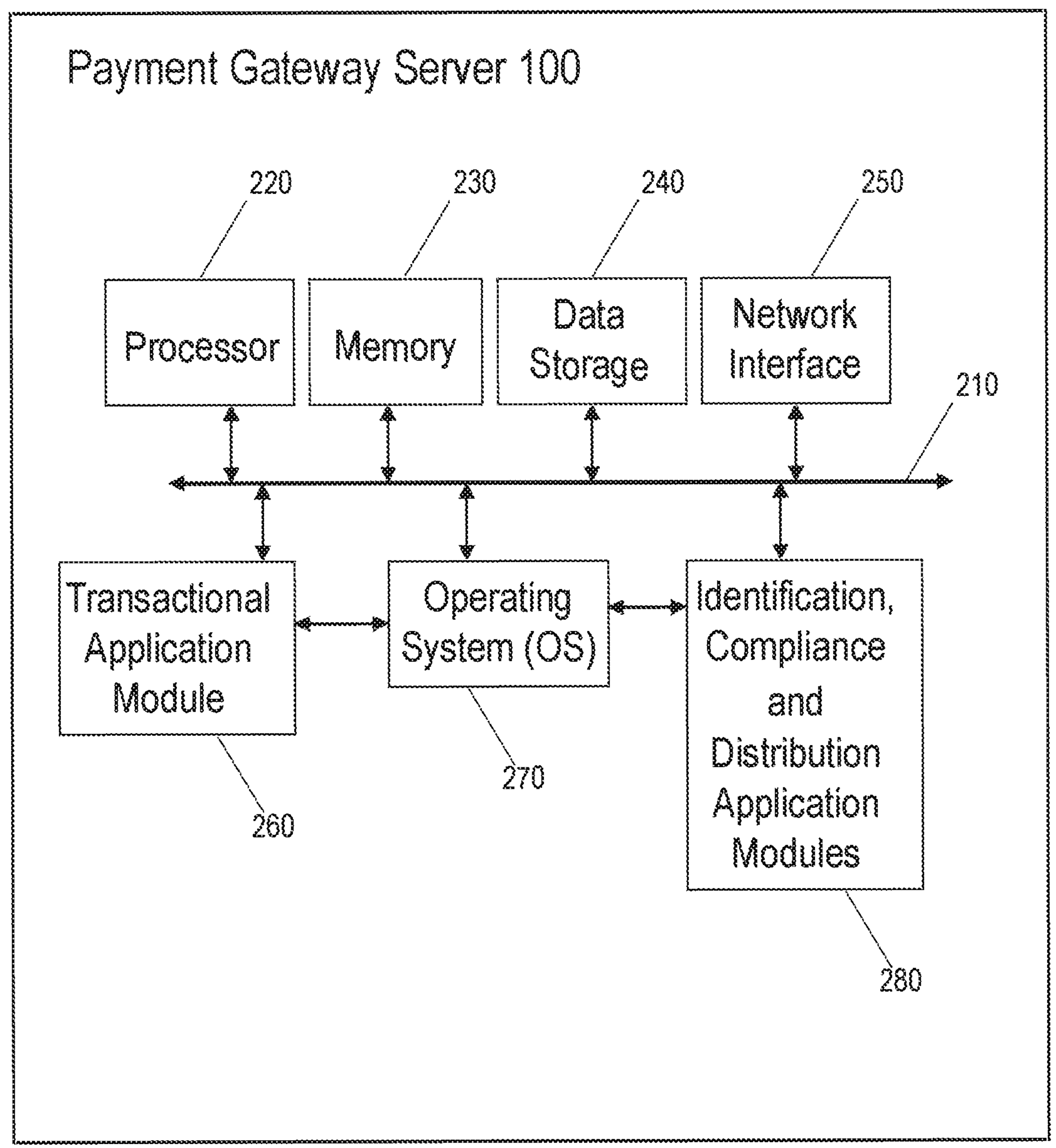
FIG. 2 illustrates exemplary components of an embodiment of the Payment Gateway server according to the invention.

As shown in FIG. 2, the Payment Gateway server 104 includes a processor 220, memory 230, data storage 240 and a network interface 250 enabling web communications. The server operating system 270 enables operation of two sets of program modules 260, 280. Transactional Application Modules 260 provide conventional payment gateway tasks such as receipt of data related to a conventional transaction payment process from the buyer and seller, forwarding of data to Payment Provider Services 130 for approval of a transaction; receiving responses (e.g., approvals or denials to authorization requests with codes indicating why an authorization has failed); and providing responses to the Seller and Buyer.

Figure 3:
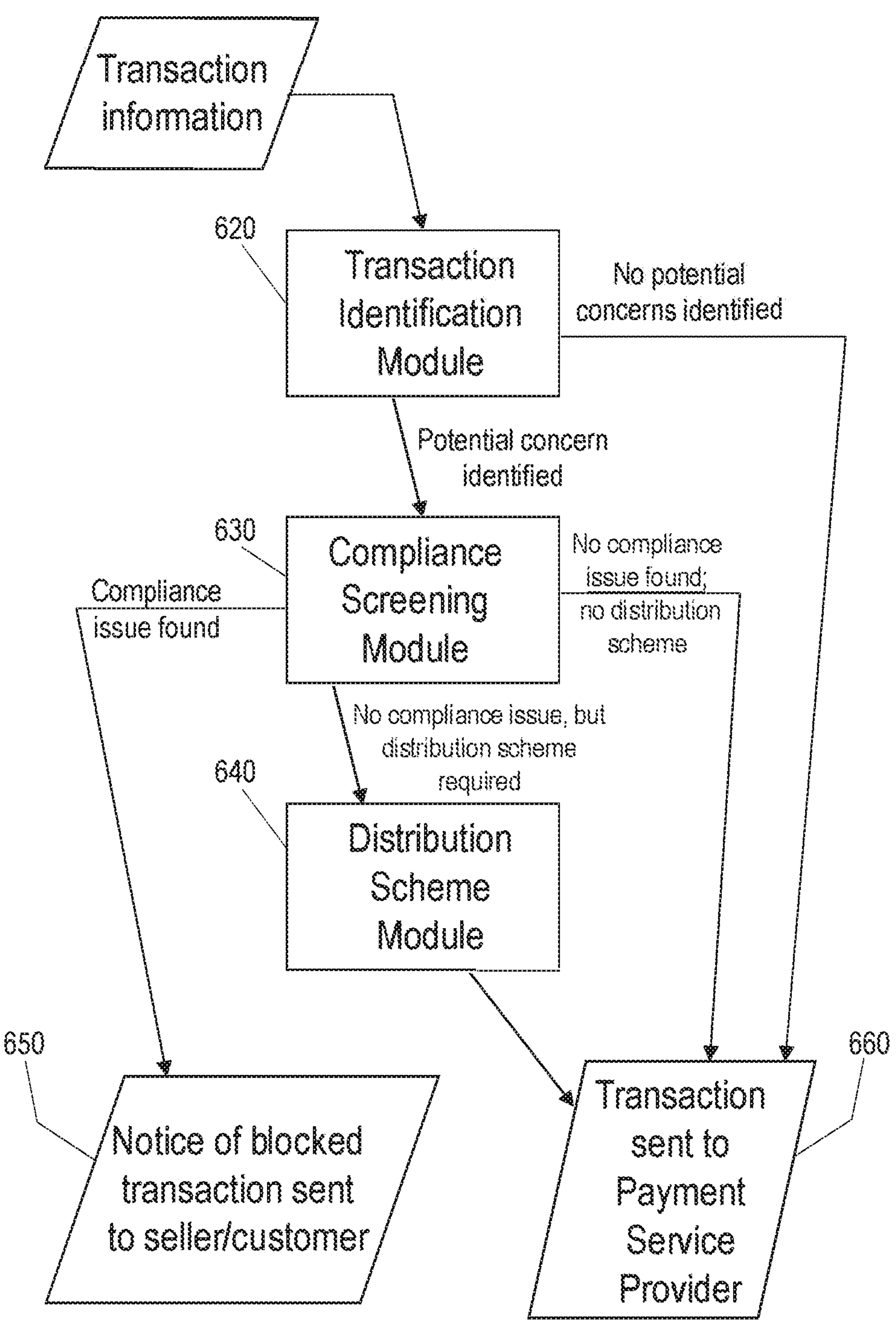
FIG. 3 is a block diagram showing components of the Payment Gateway server according to the invention.
Figure 4:
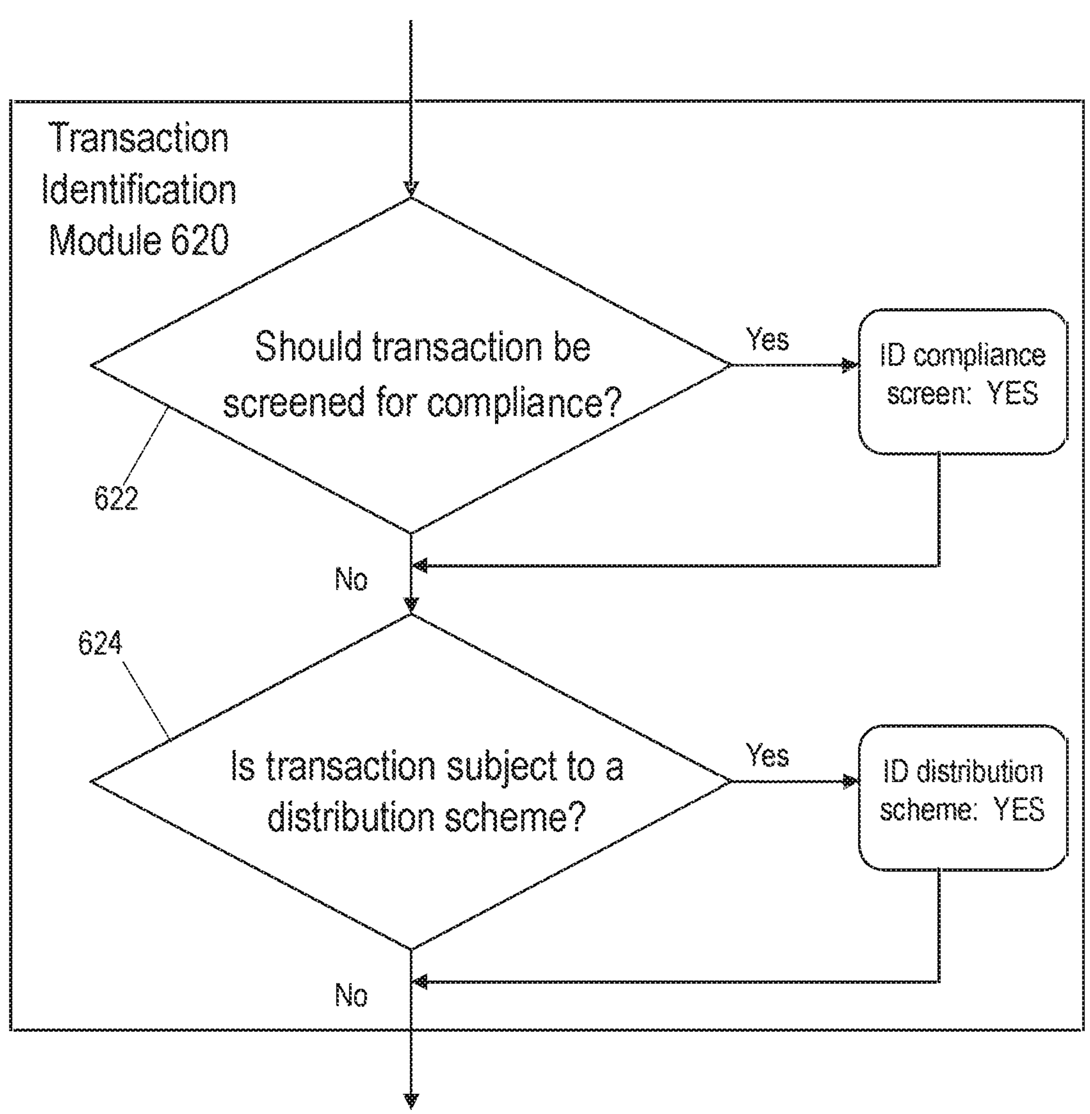
FIG. 4 is a flow chart describing operation of a Transaction Identification Module running in the Payment Gateway server of FIG. 2.

Referring also to FIGS. 2, 3 and 4, the Payment Gateway server 104 also includes a set of Identification, Compliance and Distribution Application Modules 280 which make determinations based on comparisons between information accessed from the Data Storage 240 and information received from the buyer or seller specific to individual transactions. A Transaction Identification Module 620 reviews data received for a particular transaction with information in Data Storage 240 to determine (i) whether the transaction may involve a compliance concern or (ii) whether the transaction is identifiable as one subject to a distribution scheme, requiring allocation of revenue from the buyer to one or more parties in addition to the seller. If there is no compliance concern and if no distribution scheme applies to funds to be paid by the buyer, then the Transaction Identification Module 620 initiates action by the Transactional Application Module to proceed with sending transaction information to one or more of the Payment Provider Services 130.

If the Transaction Identification Module 620 identifies a transaction to be of the type which requires screening for compliance, then the transactional information is sent to the Compliance Screening Module 630 to assess whether the transaction is to be denied (Gaming, Pharma, etc.). If the transaction is denied based on a compliance issue, a notice that the transaction is blocked is sent to the buyer and seller and no transactional information is forwarded to a Payment Provider service.

If the Compliance Screening Module 630 determines no compliance concern exists for the transaction, and the transaction has not been identified as one for which a distribution scheme applies to funds to be paid by the buyer, then the Compliance Screening Module 630 initiates action by the Transactional Application Module 620 to proceed with sending transaction information to a payment prover Service 130. On the other hand, when the Compliance Screening Module 630 determines no compliance concern exists for the transaction, but the Transaction Identification Module 620 has identified the transaction as one for which a distribution scheme applies to funds to be paid by the buyer, then the Distribution Scheme Module:

- Obtains the distribution scheme for the transaction from Data Storage 240,
- Initiates actions in one of the Transaction Application Modules 260 to send to a Payment Provider Service 130 transaction information for approval of the total payment amount and, subject to such approval,
- Initiates multiple actions in the Transaction Application Modules 260 to send, to one or more Payment Provider Services 130, transaction information to effect payments of portions of the total payment amount to each of the designated recipients in accord with a predefined distribution allocation or fee associated with the transaction to access the financial institutions 140 designated to receive the allocation or fee for the associated recipients.

FIGS. 5-19 illustrate exemplary data screen information for implementing Distribution Schemes.

FIG. 5 illustrates a distributions list form. It will contain the list of the distribution schemes created for a specific portfolio. FIG. 6 illustrates an exemplary Distribution Scheme form. The form allows the merchant to specify separate steps (allocations) in a scheme. In order to add a specific scheme (created on portfolio level) to a merchant, a new form is added on Merchant perspective.

FIG. 7 illustrates a Distributions form having an option to attach a scheme to a merchant. FIG. 8 illustrates making changes to a Fee form. The Distribution section on shows or hides the Distributions section on deposit merchant statements; the M/F options will specify the source of merchant fees (merchant or convenience balance). FIG. 9 illustrates the Position of the Convenience Fee balance field in the Remittance section on Merchant perspective. The Distributions section is added to deposit statements if a respective option is selected in the fee policy of the merchant. Drills of funds distribution in the related transactions will also be available. The general look of the section is shown in FIG. 10.

FIG. 10 illustrates the Distribution section included in the respective submissions with an option to drill down to transactions (drills2). FIG. 11 shows information on transactions involved in a specific type of funds distribution, it has an option to drill down to a distribution rule related to a specific transaction (drills 1 on the screenshot).

FIG. 12 illustrates Low level drill to a distribution rule related to a specific transaction. The screenshot shows 3 use cases (SRN, Locktrust, SND), whereas there will be only one rule on a real form. '?' marks correspond to placement of show tooltips with information on source and destination of funds. The third use case (SND) also gives an option to show all the amounts that make up the total vendors amount ($875 on the screenshot). Also, this drill has a button that opens the respective distribution scheme.

FIG. 13 illustrates a Vendors section, showing amounts and shares of all vendors connected with the given transaction. The 'Load' button ('Distributions' section) presents all the distributions related to this transaction.

FIG. 14 illustrates the general look of the Distributions perspective. The +New button brings up a popup menu with option Vendor/Holding account. FIG. 15 illustrates New Vendor/Holding account creation pages. FIG. 16 illustrates a Distribution statements search form, available after recipient selection. The 'Modify' button opens a specific distribution statement. FIG. 17 illustrates Distribution statements with an option to group information by date and by merchant. The Drill button opens a low level drill with transactions involved in the distribution for 1 day for a specific merchant. FIG. 18 Low-level drill of transactions with amounts sent to a selected recipient (use cases (Examples) 1 and 2). FIG. 19 illustrates a Low-level drill of transactions with amounts sent to a selected recipient (use cases/Examples 3 and 4).

The disclosed system and method enable gateway customization which reliably directs a calculable portion of the buyer's payment to target organizations. Thus, when a merchant sells taxable services to a buyer (e.g., access to gaming), the Payment Gateway 100 enables, upon approval of the transaction, immediate payment allocation of portions of the transaction payment to one or more designated recipients in addition to the seller (e.g., a tax authority such as the US Internal Revenue Service to provide payment in accord with tax requirements for the activity). To the extent the buyer pays a taxable member fee (e.g., monthly subscription) or deposits funds in an e-wallet for taxable gaming activities, the scheme defines an immediate allocation of monies which are provided to the tax authority upon payment by the buyer. The customization provides rules and criteria to determine whether the tax is to be paid. The criteria are extracted from the data base that stores tax information applicable to domestic and international gaming transactions. The data base also provides information to apply the rules and determine whether to place a block on the transaction in order to avoid illegal activities which can create liability or criminal offenses. The system can be programmed to accommodate a variety of schemes.

Although sales taxes are conventionally paid by a merchant directly to a tax authority, the scheme can easily provide immediate payment to the state authority, thus reducing burden on the merchants. Other types of allocations can also be made at the gateway level. For example, in the United States, when gasoline is purchased with electronic payments (e.g., by debit or credit card) state and federal taxes can be immediately allocated in accord with a scheme approved by the merchant to comply with all requirements. Any allocation can be made in accord with a scheme. So, the gateway could allocate and immediately pay shipping costs to a shipping company, which can be faster and more efficient than sending the portion of the payment for shipping to the merchant, after which the merchant pays the shipping company. A scheme can also be developed to collect and rapidly deliver funds in a variety of benevolent or charitable contexts.

For example, if a buyer and seller agree to donate a portion of a payment to a cause, the scheme can cause the gateway to automatically send the appropriate portion of the payment to the designated organization. Again, this eliminates unnecessary movement of funds to or through the merchant before reaching the ultimate designated entity.

Still another feature of the invention is provision of location data based on information available from mobile devices. This may be GPS information or information otherwise made available from or through a service provider. This information can be combined or incorporated with the electronic information received by the gateway at the time of the transaction and the gateway can be programmed to determine the location from which the buyer is initiating the purchase. Based on the rules and the data base information, the system determines whether the type of transaction is subject to any legal restrictions based on applicable laws and regulations which concern the transaction the buyer location and the merchant location. The system may automatically block the transaction based on information associated with the buyer's payment (e.g., credit/debit card information or e-wallet information) or based on location information for the device used by the buyer to initiate the purchase. In other situations, the scheme may cause the system to perform an allocation such as payment of tax revenue based on the transaction.

Although the inventive concepts have been described in the context of an embodiment of the Payment Gateway 100, it is to be understood that the same and similar concepts may be applied to provide a similar system for any payment service provider, or networks comprising multiple payment service providers. The payment service providers manage connectivity and communications with other networks. The providers individually or in a network provide online services for accepting electronic payments by a variety of payment methods and connect to banks and payment networks.

The invention has been described with reference to multiple embodiments, and numerous modifications will be apparent to persons skilled in the art without departing from the spirit and scope of the invention which shall only be limited by the claims which now follow.

What is claimed is:

1. A method for processing requests for financial transactions and payments, the method comprising the steps of:

providing a payment gateway having:

a server in bidirectional communication via a network with both a merchant system operated by a seller and a payment provider service;

a processor;

a memory; and a storage, the storage being a non-transitory computer-readable medium including:

a series of program steps for execution on the processor to respond to the requests for financial transactions and payments; and a first information set for implementing a set of compliance rules to determine compliance of a transaction initiated by a buyer;

receiving from a point of sale, a second information set about the transaction, the second information set including a location information of the buyer at the time of initiating the transaction, and a transaction information relating to a payment by the buyer into the server of the payment gateway; and performing the series of program steps based on the set of compliance rules applicable to the transaction, wherein execution of the series of program steps by the processor implements the set of compliance rules and a payment process;

screening the transaction for a violation of the set of compliance rules;

setting, based on a result of the screening, a status of the transaction to a block when a violation is detected and to an authorization when no violation is detected;

determining, by execution of the program steps, whether the transaction requires screening for applicability of a predefined distribution scheme, wherein when the status is the authorization, generating and sending, from the server of the payment gateway to the payment provider service, a request for transfer of electronic funds to provide a seller's payment for sale of the service or goods.

2. The method of claim 1, wherein a decision provided by the set of compliance rules, whether to block or allow completion of the transaction, is based on executing a sequence of rules-based decisions based on identification or comparison of information received from the buyer or seller using information retrieved from storage.

3. The method of claim 1, wherein the series of program steps include determining whether the transaction is one for which a distribution scheme applies to funds to be paid to recipients in accord with a predefined distribution allocation.

4. The method of claim 3, further including providing requests to allocate portions of a total amount of funds to the recipients in accord with the predefined distribution allocation.

5. The method of claim 4, wherein the provided requests to allocate the portions of the total amount of funds are affected without the direct involvement of the seller or the seller's bank a seller's bank to determine and authorize payments.

6. The method of claim 5, wherein the allocated portions of the total amount of funds for the recipients are for one or more fees taken from the group consisting of a convenience fee, a reseller fee, a shipping charge, and a charitable contribution.

7. The method of claim 1, wherein the step of performing the series of program steps includes assessing legal compliance.

8. The method of claim 1, the method further comprising executing compliance and payment processes and providing a decision based on the location information of the buyer as to whether to block or authorize the transaction.

9. The method of claim 1, wherein when the compliance rules and the payment process provide a decision to authorize the transaction, the series of program steps provides a request to a payment provider for transfer of electronic funds to provide a seller's payment for sale of service or goods.

* * * * *